United States Patent [19]

Johnson

[11] 4,266,752
[45] May 12, 1981

[54] SEAL STRUCTURE

[75] Inventor: Stephen A. Johnson, Fountain Valley, Calif.

[73] Assignee: MCC Flowseal, a unit of Mark Controls Corporation, Huntington Beach, Calif.

[21] Appl. No.: 25,498

[22] Filed: Mar. 30, 1979

[51] Int. Cl.³ ............................................. F16K 25/00
[52] U.S. Cl. ................................... 251/173; 251/306; 277/167.5; 277/206 R
[58] Field of Search ....................... 251/173, 175, 306; 277/167.5, 206 R, 165

[56] References Cited

U.S. PATENT DOCUMENTS

| | | | |
|---|---|---|---|
| 3,563,510 | 2/1971 | Priese | 251/173 |
| 3,642,248 | 2/1972 | Benware | 251/175 X |
| 4,005,248 | 2/1975 | Eggleston | 251/173 |
| 4,088,299 | 5/1978 | Maciulaitis | 251/173 |
| 4,130,285 | 12/1978 | Whitaker | 251/173 X |

*Primary Examiner*—Harold W. Weakley
*Attorney, Agent, or Firm*—Kirkland & Ellis

[57] ABSTRACT

A sealing structure capable of various uses and particularly in butterfly valves having a body with a flow passage and a movable valve disc in the flow passage and having a sealing surface. The sealing structure is mounted in the body to engage the disc in the closed position of the latter to provide a high performance (i.e. bubble-tight) seal. The sealing structure includes an annular seal retaining cavity with a slot opening to the flow passage. The structure includes a seal ring of Teflon, PFA or the like retained in the cavity and sealing one axial side of the ring from the other. It also has a tongue-like extension projecting through the slot into the passage and having a seat at its end engageable with the sealing surface of the disc. The seal and cavity structures have shoulders normally (in open position of the valve) abutting each other to seal the interior of the cavity (the abutment occurring from expansion of the seal ring into place in the cavity). When the disc radially moves the tongue and seat it also separates the shoulders. Radial spaces are normally provided at opposite sides of the ring and the adjacent sides of the cavity. At the end opposite the slot and tongue the cavity terminates in an anchoring and sealing groove for an extending terminal end of the seal ring. Intermediate the radial spaces and the anchoring groove terminal end are adjacent convergent cavity and ring walls that normally barely abut or are in close proximity to each other. A core of substantial cross-section is located within the main body portion of the ring. When the valve is closed the convergent surfaces are engaged, the main body portion of the ring and the core are compressed and expanded to apply a radially directed force to the tongue and seat forcing them against the disc to effect a static seal. When fluid pressure is applied, the pressure acts in the space at that upstream side between the interior of the cavity and the adjacent exterior of the ring. This results in the ring and core producing an increased radially directed sealing force against the disc.

14 Claims, 8 Drawing Figures

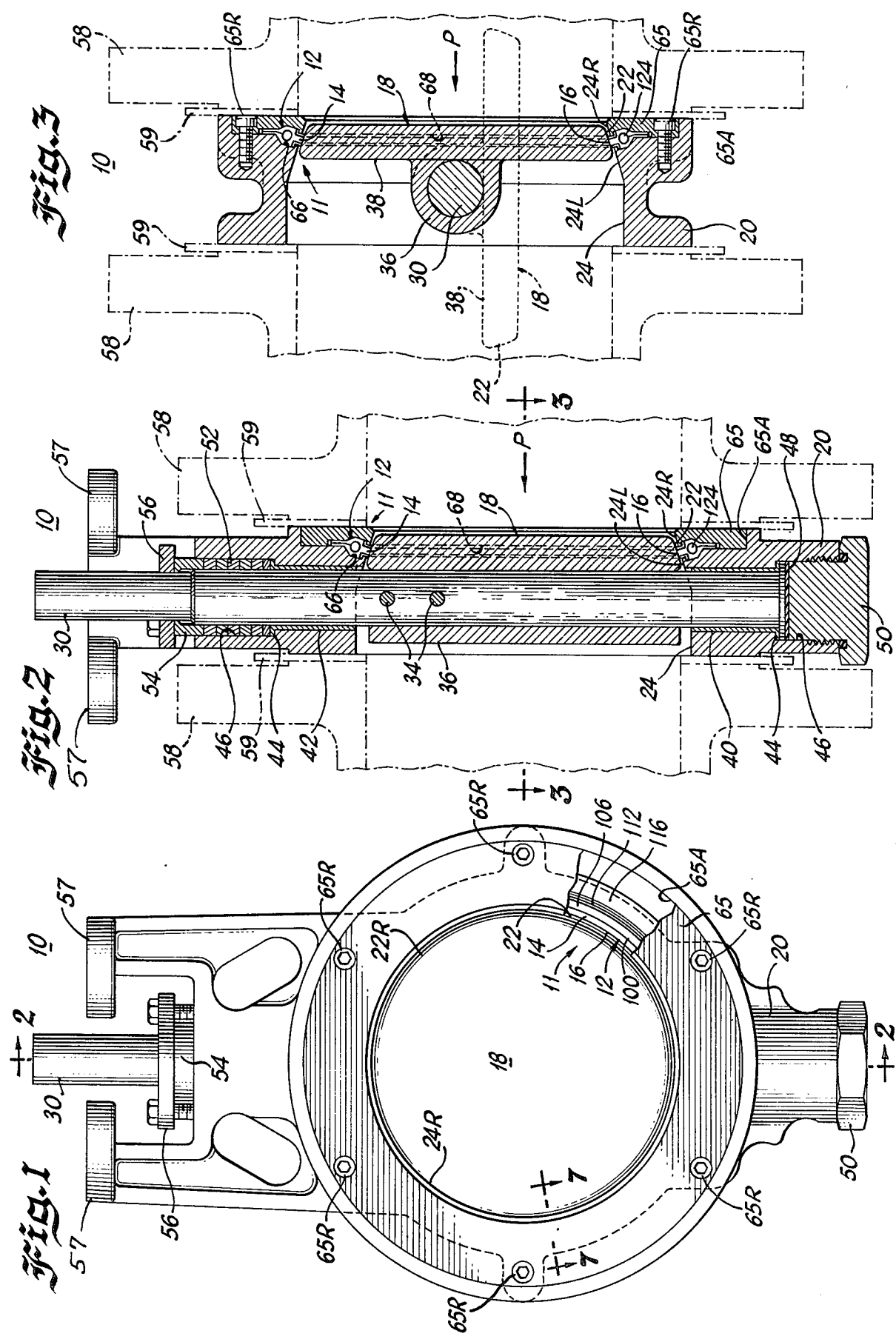

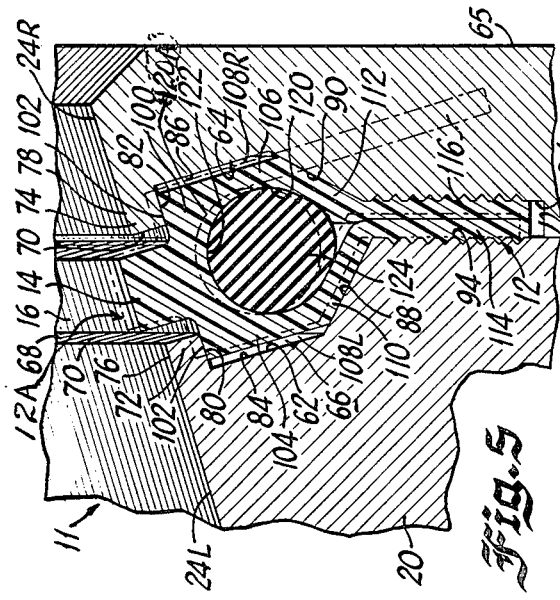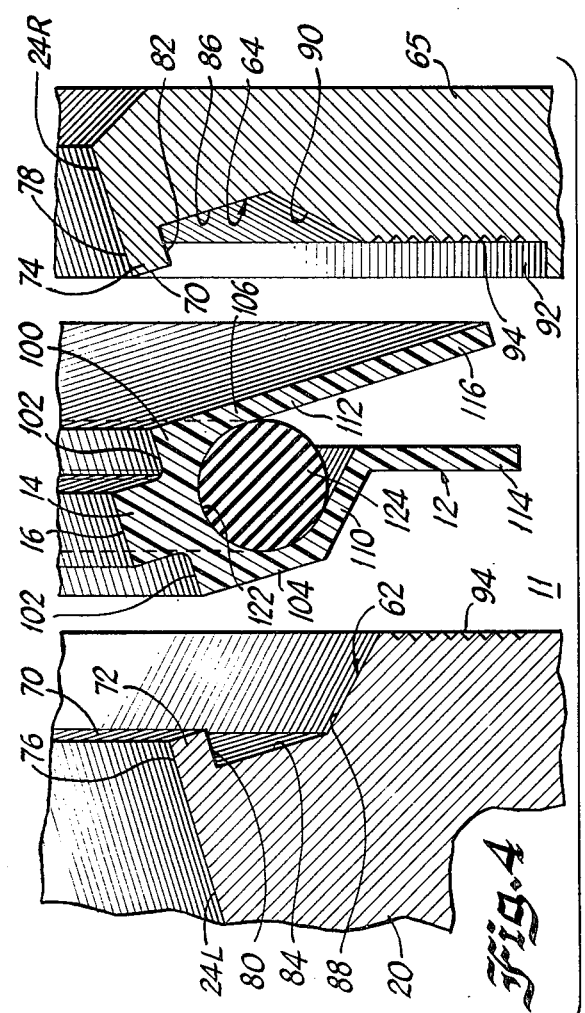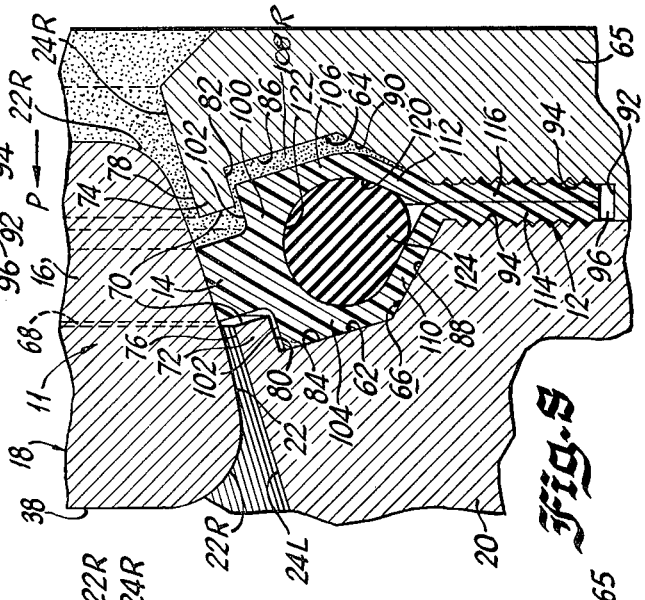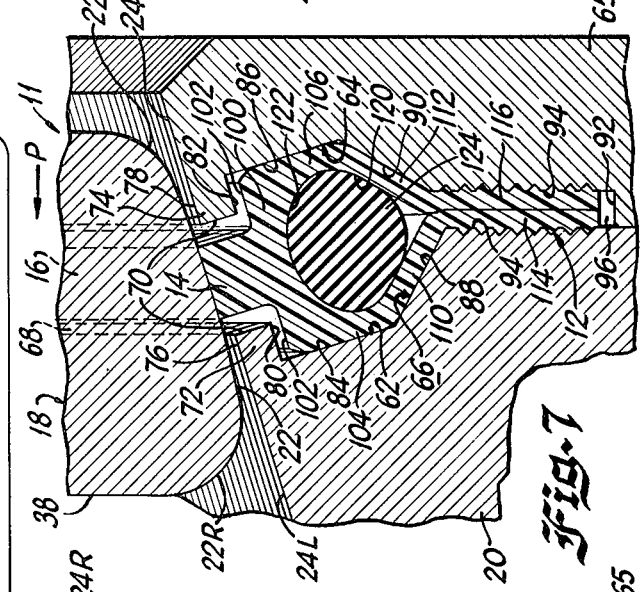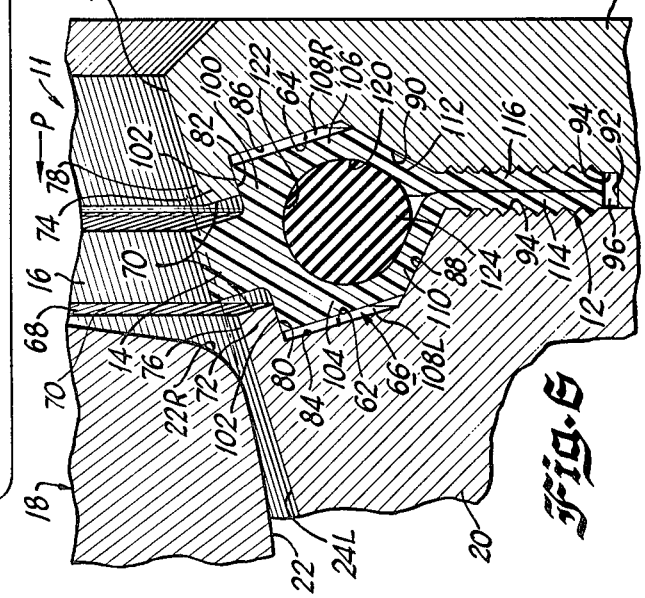

SEAL STRUCTURE

The present invention relates to seal structures, and more particularly to improved seal structures useful for flow controlling devices such as butterfly valves.

BACKGROUND OF THE INVENTION

With the increased use of higher pressures and temperatures and many different fluids, many of which contain foreign substances, corrosives and other contaminants, and practically all requiring flow control, much consideration has been given to the matter of sealing and flow controlling devices. In most cases, the devices are valves of various types. Cost of manufacture, tight manufacturing tolerances, ease of installation and operation, reliability, minimization of damage by contaminants and replacement of seals are factors to be considered. A major one is the availability of a bubble-tight reliable seal which utilizes the pressure of the fluid being controlled to enhance the sealing in the closed position of the valve.

One use of the invention is in butterfly valves and the present invention will be described in conjunction therewith.

OBJECTS OF THE INVENTION

An object of the present invention is to provide a new and improved seal structure especially adapted for use in or with devices having juxtaposed movable parts such as valves and the like, although it may be used elsewhere.

It is a further object of the invention to provide a reliable, easily made and installed effective seal capable of use under many and adverse conditions.

A still further object is the provision of a new and improved seal structure including cooperatively associated seal receiving and retaining cavity structure in which effective static sealing is obtained as with the valve closed and in the absence of fluid pressure and in which fluid pressure at the upstream side is effectively used to enhance the sealing effect in dynamic sealing, i.e., with the valve closed and under pressure.

Another object of the invention is the provision of a new and improved seal making effective use of the Poisson effect in its operation.

Another object is the provision of a new and improved valve embodying the seal of the invention.

Still another object of the invention is the provision of a seal structure and materials contributing to more effective use of the Poisson effect.

Other objects and advantages of the invention will become apparent from the ensuing description of an illustrative embodiment thereof, in the course of which reference will be had to the accompanying drawings.

SUMMARY OF THE INVENTION

A seal structure of providing fluid sealing between juxtaposed first and second members, such as a movable valve member or disc (in the case of a butterfly valve), having an annular peripheral sealing surface and second member such as a valve body having a substantially axial flow passage defined by an annular surface surrounding and normally slightly spaced from the disc; one of said members having an annular interior cavity of predetermined axial width and an annular radial slot defined by spaced apart radial end walls opening to the passage at its surface and which is narrower than the cavity. The cavity includes oppositely and axially extending flanges with shoulders at their undersides adjacent the slot, parallel spaced interior sidewalls extending radially from the distal ends of the shoulders, radially extending and convergent interior sidewalls continuing from said respective interior sidewalls, and a narrow anchoring groove extending from the ends of the convergent sidewalls. An annular fluid seal ring of a material, such as Teflon is mounted in the cavity. It has a main body portion with parallel exterior sidewalls adjacent to but normally spaced from the cavity interior sidewalls; convergent exterior walls closely spaced or barely abutting the interior convergent walls of the cavity; and terminal extensions from the convergent walls into the anchoring groove, to which they are sealed. The ring is provided with a tongue radially projecting through and movable in said slot and engageable by the other of said members, and with external shoulders extending axially from the sides of the tongue to the ring sidewalls. The ring shoulders have diameters somewhat smaller than those of the flange underside shoulders so that the ring has to be stretched to get it into place. The interior of the main body portion of the ring defines an annular sealed opening of substantial cross-section. A normally substantially tension free or relaxed annular core of a material such as an elastomer of substantially the same cross-section is placed in it. The dimensions of the cavity and seal structures are such that (1) when the seal ring seat is not engaged with the sealing surface, the two sets of shoulders abut with considerable force, the convergent walls of the ring and cavity abut or are in close proximity and the parallel sidewalls are spaced apart a short distance; (2) when the seat and sealing surface are engaged in the absence of fluid pressure the seal ring is radially compressed and the tongue is radially moved, the sets of shoulders separated, the convergent surfaces are forcibly abutted, and the main portion and the elastomeric core are axially expanded and radially compressed to effect radially acting sealing between the first and second members, and thereafter, (3) when fluid pressure is applied, it has access past the shoulders to the upstream side space between the cavity and ring axially to compress the ring and elastomeric core to increase, as a result of the Poisson effect, the radially acting sealing effect of the seat on the sealing surface.

BRIEF DESCRIPTION OF THE DRAWINGS

FIG. 1 is an elevational view, partly broken away, of a butterfly valve including a seal structure, the valve and the seal structure embodying the invention;

FIG. 2 is a diametrical axial vertical cross-sectional view, taken along the line 2—2 of FIG. 1, of the valve in its closed position, showing it installed in a pipeline, the latter being shown only in phantom;

FIG. 3 is a horizontal cross-sectional view of the valve taken along the line 3—3 of FIG. 2 with the valve closed but also showing, in phantom, the movable member (disc or vane) of the valve in its open position;

FIG. 4 is an enlarged cross-sectional unassembled view of the seal structure including the seal ring and its associated receiving and retaining cavity (formed by the valve body and a retainer ring) prior to assembly; this view and the following ones being taken along line 7—7 of FIG. 1;

FIG. 5 is a cross-sectional view illustrating the parts assembled in solid lines and illustrating in broken lines the relationships of the seal ring prior to assembly;

FIG. 6 illustrates the structure with the movable member approaching the seal structure, i.e., the valve partially open;

FIG. 7 illustrates the valve closed but with no pressure in the flow passage, i.e., the static closed position; and FIG. 8 is like FIG. 7 but with fluid pressure applied at the upstream side of the valve disc, this being the right side of the valve as shown in FIG. 8 and indicated by the stippling.

Referring now to the drawings, and first to FIGS 1, 2 and 3 it will be noted that the invention has been illustrated in conjunction with a butterfly valve 10 for controlling the flow of fluid through it and including the seal structure 11 of the present invention.

The seal structure includes an annular seal ring 12 with a projecting tongue or piston-like portion 14 having a seat 16 at its free end facing and engageable with a disc or vane (to be further described) juxtaposed between first and second members, the first member being a valve disc 18 and the second valve body 20.

The disc is shown as a section of a sphere having a peripheral spherical sealing surface 22, with radii 22R at its edges.

The disc is movably mounted in a flow passage P through the valve, the fluid being able to flow and be controlled in either direction of flow, with preferred flow direction being indicated by the arrow associated with the passage. The flow passage includes an annular inner surface 24 (with portions 24R and 24L, as best shown in FIGS. 4-8) juxtaposed to the edge of the disc and, as illustrated, slightly spaced therefrom and so that the tongue and its seat project into the space for engagement with the disc.

The valve disc is rotatable by a shaft 30 attached by pins 34 to an elongated lug 36 at the back side 38 of the disc. The disc is axially displaced from axis of rotation of the shaft and the shaft axis intersects the center of rotation of the spherical section of the disc periphery. The shaft is journalled in sleeve bearings 40 and 42 projecting through body portions and having annular locating collars 44 abutting against counterbores 46 in the body.

The bearing collar 44 abuts against the flanged lower end of shaft 30 and the latter abuts against an end thrust washer 48 of Teflon, which is held in place and supported by a threaded closure cap 50.

The upper portion of shaft 30 is journalled in its bearing 42 with its collar. It is surrounded by suitable conventional packing 52 including a gland 54 and follower 56 bolted to the body. The body also has an upstanding platform 57 for valve operating means, not shown.

The valve body is mounted in conventional manner between gaskets 59 on pipe flange 58, shown in phantom. The pipes may be considered to constitute part of the flow passage.

The region of flow passage at the seal structure is inclined somewhat as indicated by reference characters 24R and 24L so as to be parallel to the sealing surface 22 of the disc. Even though it is not truly axial but is inclined slightly (conical) it is referred to as extending axially. The region includes counterbores 62 and 64 in the body 20 and a seal retainer ring 65 secured in a counterbore 65A in the valve body by screws 65R. The counterbores 62 and 64 define a receiving and retaining cavity 66 for the seal ring 12.

Referring now more particularly to FIGS. 4 to 8, the cavity has a generally longitudinal axis at right angles to the sealing surface 22 of the disc and its interior is relatively wide axially (i.e., generally parallel to the flow passage P and surfaces 24R and 24L). A radial slot 68 extends from the interior of the cavity into the flow passage and receives the tongue 14. The tongue may be and is shown axially spaced from the edges of the slot which are defined by the opposed end walls 70 of flanges 72 and 74 of opposed flange structures 76 and 78 forming parts of surfaces of the flow passage P and its portions 24R and 24L. The undersides of the flanges form shoulders 80 and 82.

The cavity 66 includes parallel spaced interior sidewalls 84 and 86, extending radially from the distal ends of the shoulders 80 and 82, and convergent interior sidewalls 88 and 90 continuing from said respective sidewalls. The cavity terminates in a narrow anchoring groove 92 extending from the ends of the convergent sidewalls, the groove actually being a counterbore on the seal retainer ring 65. The structure of the groove is serrated at its opposite sides 94 better to hold and seal the ring. An expansion space 96 is provided at the end of the groove to accommodate expansion of the seal ring.

The seal ring 12 includes an annular main body portion 100 fitting into the cavity 66 and as noted earlier it has the tongue 14 with its seat projecting through slot 68 for an interference fit with the sealing surface 22 of disc 18, as best shown in FIGS. 6, 7 and 8.

The seal ring is made of relatively rigid, flexible, corrosion resisting material, having minimum friction, such as Teflon, and the like. It has laterally extending external shoulder structure comprising the shoulders 102 extending laterally from the base of the tongue 12 to the parallel spaced apart sidewalls 104 and 106. The ring shoulders are designed to abut the cavity underside shoulders. The ring sidewalls 104 and 106 parallel and are spaced somewhat from cavity sidewalls 84 and 86 to provide spaces 108R and 108L into which the seal structure may be expanded, as hereinafter explained.

The sidewalls of the ring are joined to convergent ring sidewalls 110 and 112, which in turn are joined to anchoring extension walls 114 and 116 which are, when the seal structure is assembled, clamped in the anchoring groove 92, as shown in FIGS. 5 to 8.

As already noted the ring has the parallel, convergent and anchoring sidewalls, as well as, the connecting part. The major portions of these define the main body portion 100, which in accordance with a feature of the present invention define, when assembled on the valve body, an annular sealed opening 120 which may be of generally circular cross-section. Actually, the ring is performed in the shape shown in FIG. 4 and is formed into its ultimate shape when clamped in place, as shown in FIGS. 5 to 8.

One side wall securing extension 116 constitutes a first and straight integral unit for abutment and final shaping by the retainer ring. The other is made with the side and diagonal walls angled to fit the interior of the cavity, while the extension wall 114 is at an angle but brought against the other extension wall, which is also formed into shape in the final assembly. Between the closed ends of the walls is a circular opening 120 terminating in a semicircular end 122.

A further feature of the invention is the placement of an elastomeric core 124 of circular cross-section within the opening 122. Cores having cross sections other than circular contoured to fit into and substantially filling a similar opening could be used. The core 124 lies lightly in the opening against the closed end of the opening.

The core can be thus placed by stretching it to pass it over a sidewall structure and into the opening in which it is substantially tension free. The core is made of material with a high Poisson Ratio and low Young's Modulus such as Viton, silicone, etc.

The dimensions of the cavity, ring and core are important, especially the annular diametrical ones, and the cross sectional area of the core relative to the main body. As noted the initial dimensions of the ring are such that it has to be expanded when put in place, it having a smaller inside diameter than the undershoulders 80 and 82 and also has to be displaced axially to get into position to get a shoulder 102 under shoulder 80, this being done first in assembly, as further noted herein. It is moved axially relative to the cavity formed in the body to get it into place to be held by the retainer ring 65. This is indicated by the dotted line showing and phantom reference character 12A in FIG. 5.

To install the seal ring, the core 124 is first placed in the opening 120 in the ring where, as earlier noted, it just fits into and abuts against the closed end 122 of the opening 120, i.e., it is substantially relaxed and exerts no appreciable tension on the ring in its normal initial position. The ring is then stretched and its left shoulder 120 and angled sidewall 104 is placed over the flange 72 on the body; the angling of sidewall portions 140 and 110 facilitating assembly of the ring on the body and, thereafter, the retainer ring 65 can be more easily placed on the sealing ring and the whole assembly be located relative to the body by axial movement and secured by screws 65R. It is thus held in place by the resulting tension and abutment of the shoulders (and to some extent by the attachment within groove 92, which also provides the sealing between the two sides of the ring). As noted earlier, the installation effects some change in shape and dimensions of the seal ring and core. When installed, and as shown in FIG. 6, the ring and cavity shoulders abut quite forcibly and remain so under valve open and normal pressure, (which may be a high pressure) fluid flow conditions.

At the same time that the two sets of shoulders abut with substantial force, the convergent walls of the ring and cavity barely abut and the parallel sidewalls are spaced apart a short distance providing the spaces 108R and 108L as shown in FIGS. 5 and 6. The tongue 14 with its seat 16 are at their innermost positions and the core is compressed very slightly. The convergent, abutting walls assist in directing the sealing pressure, some of which exists in the convergent region, radially inward toward the disc.

Further, the core 124 is displaced from phantom position 120A with the ring and is expanded slightly and compressed so that it becomes somewhat "tear drop" in shape. The core, however, has no appreciable compressive effect on the ring, which is strongly held by the shoulder to shoulder abutment.

FIG. 6 illustrates the same relationships as FIG. 5, but adds a showing of the valve disc 18 approaching the seal ring as the valve is being closed.

When the seal and sealing surface are engaged to close the valve in the absence of fluid pressure, the seal ring is appreciably radially compressed (somewhat flattened) as shown in FIG. 7, and the tongue 12 remains substantially centered in slot 68 but is radially moved, the shoulders are separated, the convergent surfaces are forcibly abutted and the main body portion of the ring and the elastomeric core are axially expanded and direct the seating force radially and effect sealing between the first and second members, i.e., the valve disc 18 and ring seat 16.

In the presence of fluid pressure, it has (as shown by the stippling in FIG. 8) access past the shoulders 82 and 102 to the upstream side space 108R between the cavity and ring axially to compress the two, substantially to fill space 108L and slightly shift tongue 14. This has the effect of making the core more "tear drop" shaped, i.e., somewhat more elongated than originally, to apply greater radial sealing force on the tongue without restricting its movability, thereby to increase the Poisson sealing effect of the seat on the sealing surface. The fluid pressure may be applied as the valve is closed when fluid is flowing, or the valve may be closed when the fluid pressure is applied. Generally, the fluid pressure would also move the valve disc 18 to the left (for left flow) slightly, as shown.

After the fluid pressure has been removed and the disc opened, the seal is returned toward its FIG. 6 position (valve open) primarily by the abutting relation of the convergent walls.

The foregoing "tear drop" shape indicates that the core and its associated opening need not be circular. What is required is that the core substantially fill its associated opening and that both be susceptible to radially outwardly directed forces to permit radial movement of the tongue and seat, as in the static closing and sealing situation. In dynamic sealing the fluid pressure acts axially on the seal to produce a radially inwardly directed seating force. The cavity, ring and core structures should be configured to permit, confine and direct radial seating pressures against the sealing surface, as in the illustrated valve where radially directed sealing is required for the axially flowing fluid.

The seal structure and valve may be used to control flow in either direction, the preferred flow being from left to right. The angularity of the seal ring anchoring portion, as earlier noted, may vary, the variation being determined primarily by the size of the valve. Generally, the smaller the valve and diameter of disc, the greater the angle. Also, it should be mentioned that the shapes of the elastomeric core in FIGS. 5 through 7, are approximations because no way has been discovered to ascertain their exact shapes when installed and in operation. Further, should the Poisson effect be too great, e.g., produce too tight a seal with fluid flow, the effect can be controlled by varying proportions of the materials, such as the thicknesses of the core and the ring wall structure. It has been found that an advantage of the invention is that the same ring and core dimensions, much as indicated in the drawings, except for different annular diameters of the cavity, tongue, shoulders and core can be used for various sizes of valves. A further advantage of the seal structure of the invention is that it works well with both low and high pressures.

While the invention has been described with reference to details of an illustrative embodiment, it should be understood that such details are not intended to be limitative of the scope of the invention or of the following claims defining same.

What is claimed as new and desired to be secured by Letters Patent of the United States is:

1. A seal structure for providing fluid sealing between juxtaposed first and second members;
    the first member having an annular peripheral sealing surface;

the second member having an annular surface surrounding and normally slightly spaced from the first member;

one of said members having an annular interior cavity of predetermined axial width with a radial slot defined by spaced apart radial end walls opening to its surface and which is narrower than the cavity;

the cavity including oppositely and axially extending underside shoulders adjacent the slot, parallel spaced interior side walls extending radially from the distal ends of the shoulders, radially extending and convergent interior side walls continuing from said respective first side walls, and a narrow anchoring groove extending from the ends of the convergent side walls;

an annular fluid seal ring of relatively rigid, flexible material, mounted in said cavity having a main body portion with parallel exterior side walls adjacent to but normally spaced from the cavity interior side walls and convergent exterior walls barely abutting the interior convergent walls of the cavity, the ring having an extension from the convergent walls into and sealed to the anchoring groove, the ring also having a tongue radially projecting through and movable in said slot and terminating in a seat engageable by the other of said members, external shoulders extending axially from the sides of the tongue to the ring side walls and having outside diameters normally somewhat smaller than those of the underside shoulders, the interior of the main body portion of the ring having an annular opening of generally circular cross-section;

and a normally substantially tension-free elastomeric core of generally circular cross-section in said opening;

the dimensions of the cavity and seal structures being such that (1) when the seat is not engaged with the sealing surface, the two sets of shoulders abut with substantial force, the convergent walls of the ring and cavity abut or are in close proximity and the parallel sidewalls are spaced apart a short distance; (2) when the seat and sealing surface are engaged in the absence of fluid pressure the seal ring is radially compressed and the tongue is radially moved, the sets of shoulders separated, the convergent surfaces are forcibly abutted, and the main body portion and the elastomeric core are axially deformed and the resulting radial compression effects sealing between the first and second members, and thereafter, (3) when fluid pressure is applied, it has access past the shoulders to the upstream side space between the cavity and ring, the downstream side of the seal ring is brought into contact with the downstream side of the cavity along substantially its entire length, and the ring and elastomeric core are axially compressed to increase the sealing effect of the seat on the sealing surface.

2. A seal structure as claimed in claim 1 wherein the anchoring groove and the ring extensions therein are disposed at an angle other than the radial.

3. A seal structure as claimed in claim 2 wherein the first member is mounted for angular movement about a transverse axis and the groove and ring extensions are generally parallel to said axis.

4. A seal structure for providing fluid sealing between juxtaposed first and second members;

the first member having an annular peripheral sealing surface;

the second member having an annular surface surrounding and normally slightly spaced from the first member;

one of said members having an annular interior cavity of predetermined axial width with a radial slot opening to its surface and which is narrower than the cavity;

the cavity including an axially extending underside shoulder adjacent the slot, an interior sidewall extending radially from the distal end of the shoulder, a radially extending and convergent interior sidewall continuing from said respective first sidewall, and a narrow anchoring groove extending from the end of the convergent sidewall;

an annular fluid seal ring of relatively rigid, flexible material, mounted in said cavity having a main body portion with an exterior sidewall adjacent to but normally spaced from the cavity interior sidewall and a convergent exterior wall barely abutting the interior convergent wall of the cavity, the ring having an extension from the convergent wall into and sealed to the anchoring groove, the ring also having a tongue radially projecting through and movable in said slot and terminating in a seat engageable by the other of said members, an external shoulder extending axially from a side of the tongue to the ring sidewall and having a diameter normally somewhat smaller than that of the underside shoulder, the interior of the main body portion of the ring defining an annular opening of generally circular cross-section;

and an elastomeric core of generally circular cross-section normally under but little tension mounted in said opening;

the dimensions of the cavity and seal structures being such that (1) when the seat is not engaged with the sealing force, the shoulders abut each other with substantial force, the convergent walls of the ring and cavity abut or are in close proximity and the sidewalls are spaced apart a short distance; (2) when the seat and sealing surface are engaged in the absence of fluid pressure the seal ring is radially compressed and the tongue is radially moved, the shoulders separated, the convergent surfaces are forcibly abutted, and the main body portion and the elastomeric core are axially deformed and the resulting radial compression effects the sealing between the first and second members, and thereafter, (3) when fluid pressure is applied, it has access past the shoulders to the space between the cavity and ring, the downstream side of the seal ring is brought into contact with the downstream side of the cavity along substantially their entire length, and the ring and elastomeric core are axially compressed to increase the radial sealing effect of the seat on the sealing surface.

5. A seal structure for providing fluid sealing between juxtaposed first and second members;

the first member having an annular peripheral sealing surface;

the second member having an annular surface surrounding and normally slightly spaced from the first member;

one of said members having structure defining an annular interior cavity of predetermined axial width with a radial slot defined by spaced apart radial end walls opening to its surface and which is narrower than the cavity;

the cavity including oppositely and axially extending underside shoulders adjacent the slot, parallel spaced interior side walls extending radially from the distal ends of the shoulders, radially extending and convergent interior side walls continuing from said respective first side walls;

an annular fluid seal ring of relatively rigid, flexible material, mounted in said cavity having a main body portion with parallel exterior side walls adjacent to but normally spaced from the cavity interior side walls to define axially spaced apart spaces and convergent exterior walls barely abutting the interior convergent walls of the cavity, the ring and cavity defining structure sealing the spaces from each other, the ring also having a tongue radially projecting through and movable in said slot and terminating in a seat engageable by the other of said members, external shoulders extending axially from the sides of the tongue to the ring side walls and having outside diameters normally somewhat smaller than those of the underside shoulders, the interior of the main body portion of the ring having an annular opening of generally circular cross-section;

and a normally substantially tension-free elastomeric core of generally circular cross-section in said opening;

the dimensions of the cavity and seal structures being such that (1) when the seat is not engaged with the sealing surface, the two sets of shoulders abut with substantial force, the convergent walls of the ring and cavity abut or are in close proximity and the parallel side walls are spaced apart a short distance; (2) when the seat and sealing surface are engaged in the absence of fluid pressure the seal ring is radially compressed and the tongue is radially moved, the sets of shoulders separated, the convergent surfaces are forcibly abutted, and the main body portion and the elastomeric core are axially deformed and the resulting radial compression effects sealing between the first and second member, and (3) in the presence of fluid pressure it has access past the shoulders to the upstream side space between the cavity and ring, the downstream side of the seal ring is brought into contact with the downstream side of the cavity along substantially their entire length, and the ring and elastomeric core are axially compressed to increase the sealing effect of the seat on the sealing surface.

6. A seal structure for providing fluid sealing between juxtaposed first and second members;

the first member having an annular peripheral sealing surface;

the second member having an annular surface surrounding and normally slightly spaced from the first member;

one of said members having structure defining an annular interior cavity of predetermined axial width with a radial slot defined by spaced apart radial end walls opening to its surface and which is narrower than the cavity;

the cavity including oppositely and axially extending underside shoulders adjacent the slot, parallel spaced interior side walls extending radially from the distal ends of the shoulders, radially extending and convergent interior side walls continuing from said respective first side walls;

an annular fluid seal ring mounted in said cavity having a main body portion with parallel exterior side walls adjacent to but normally spaced from the cavity interior side walls to define axially spaced apart spaces and convergent exterior walls barely abutting the interior convergent walls of the cavity, the ring and cavity having additional structures continuing from said convergent walls for sealing the spaced from each other, the ring also having a tongue radially projecting through and movable in said slot and terminating in a seat engageable by the other of said members, external shoulders extending axially from the sides of the tongue to the ring side walls and having outside diameters normally somewhat smaller than those of the underside shoulders, the interior of the main body portion of the ring having an annular opening;

and a core substantially filling said opening;

the dimensions of the cavity and seal structures being such that when the seat is not engaged with the sealing surface, the two sets of shoulders abut with substantial force, the convergent walls of the ring and cavity barely abut and the parallel side walls are spaced apart a short distance; and when the seat and sealing surface are engaged with fluid pressure at one side the seal ring is radially compressed and the tongue is radially moved, the sets of shoulders separated, the convergent surfaces are forcibly abutted, the downstream side of the seal ring is brought into contact with the downstream side of the cavity along substantially their entire length, the main body portion and the core are axially expanded and the resulting radial compression effects sealing between the first and second members; and the fluid under pressure has access to the space at said one side axially to compress the ring and core, thereby to increase the radial pressure exerted by the tongue and seat on the sealing surface.

7. A seal structure is claimed in claim 6 wherein the core is an elastomeric material such as Viton, silicone or the like and the ring body is a polymer such as TFE, PFA or the like.

8. A seal structure for providing fluid sealing between juxtaposed first and second member;

the first member having an annular peripheral sealing surface;

the second member having an annular surface surrounding and normally slightly spaced from the first member;

one of said members having structure defining an annular interior cavity of predetermined axial width with a radial slot defined by spaced apart radial end walls opening to its surface and which is narrower than the cavity;

the cavity including oppositely and axially extending underside shoulders adjacent the slot, parallel spaced interior side walls extending radially from the distal ends of the shoulders, radially extending and convergent interior side walls continuing from said respective first side walls;

an annular fluid seal ring, mounted in said cavity having a main body portion with parallel exterior side walls adjacent to but normally spaced and convergent exterior walls barely abutting the interior convergent walls of the cavity, the ring and cavity having additional structures continuing from said convergent walls for sealing the sidewall spaces from each other, the ring also having a tongue radially projecting through and movable in said slot and terminating in a seat engageable by the other of said members, external shoulders extending axially from the sides of the tongue to the ring side walls and having outside diameters normally somewhat smaller than those of the underside shoulders;

the dimensions of the cavity and seal structures being such that when the seat is not engaged with the sealing surface, the two sets of shoulders abut with substantial force, the convergent walls of the ring and cavity barely abut and the parallel side walls are spaced apart a short distance; and when the seat and sealing surface are engaged with fluid pressure at one side the seal ring is radially compressed and the tongue is radially moved, the sets of shoulders separated, the convergent surfaces are forcibly abutted, the downstream side of the seal ring is brought into contact with the downstream side of the cavity along substantially their entire length, the main body portion is axially expanded and the resulting radial compression effects sealing between the first and second members; and the fluid under pressure has access to the space at said one side axially to compress the ring thereby to increase the radial pressure exerted by the tongue and seat on the sealing surface.

9. A seal structure for providing fluid sealing between juxtaposed first and second members;

the first member having an annular peripheral sealing surface;

the second member having an annular surface surrounding and normally slightly spaced from the first member;

one of said members having structure defining an annular interior cavity of predetermined axial width with a radial slot defined by spaced apart radial end walls opening to its surface and which is narrower than the cavity;

the cavity including oppositely and axially extending underside shoulders adjacent the slot, parallel spaced interior side walls extending from the shoulders and convergent interior side walls continuing from said respective first side walls;

an annular fluid seal ring of relatively rigid, flexible material, mounted in said cavity having a main body portion with parallel exterior side walls adjacent to but normally spaced from the cavity interior side walls to define axially spaced apart spaces and convergent exterior walls barely abutting the interior convergent walls of the cavity, the ring and cavity defining structure sealing the spaces from each other, the ring also having a tongue radially projecting through and movable in said slot and terminating in a seat engageable by the other of said members, external shoulder extending axially from the sides of the tongue to the ring side walls and having outside diameters normally somewhat smaller than those of the underside shoulders, the interior of the main body portion of the ring having an annular opening of substantial cross-section providing for some radially and axially directed forces and movement of the ring structure;

and a normally substantially tension-free elastomeric core of corresponding cross-section substantially filling said opening;

the dimensions of the cavity and seal structures being such that when the seat is not engaged with the sealing surface, the two sets of shoulders abut with substantial force, the convergent walls of the ring and cavity abut or are in close proximity and the parallel side walls are spaced apart a short distance; and when the seat and sealing surface are engaged with fluid pressure at one side the seal ring is radially compressed and the tongue is radially moved, the sets of shoulders separated, the convergent surfaces are forcibly abutted, the downstream side of the seal ring is brought into contact with the downstream side of the cavity along substantially their entire length, the main body portion and the elastomeric core are axially deformed and the resulting radial compression effects sealing between the first and second members; and the fluid under pressure has access to the space at said one side so as to compress the ring and core axially, thereby increasing the radial pressure exerted by the tongue and seat on the sealing surface.

10. A seal structure for providing fluid sealing in the presence or absence of fluid pressure between juxtaposed first and second members when the members are moved from an open to, or are in, a closed position;

a first of said members having a sealing surface;

the second member having an opposed second surface slightly spaced from the sealing surface of the first member in the closed position;

said second member having structure defining an interior cavity with a slot narrower than the cavity and extending between the second surface and the cavity and with opposed interior underside shoulders extending from the slot; the cavity including a main body portion with opposed spaced interior side wall portions continuing from the cavity shoulders away from said second surface and terminating in closely spaced groove defining walls extending centrally from the main body portion opposite said slot;

a fluid seal mounted in said cavity having an enlarged main body portion intermediate said shoulders and groove and including opposed exterior side wall portions adjacent to but normally spaced somewhat under no load conditions from adjacent interior side wall portions of the cavity to define spaced apart narrow spaces at opposite sides of the seal and terminating in structure extending from the main body portion of the seal into and being sealed in said groove, thereby to seal the spaces on opposite sides of the seal from each other, the seal also having a tongue projecting through said slot into the space between the first and second members and having a seat defining end engageable with the sealing surface of the first member in the closed position, and external shoulders extending from the sides of the tongue in juxtaposition to the cavity underside shoulders;

the dimensions of the cavity and seal structures being such that: (1) in the open position in which the seat is not engaged with the sealing surface, the two sets of shoulders abut with substantial force; (2) when the seat and sealing surface are engaged in closed position they effect an initial seal in the absence of fluid pressure by movement of the engaged seat and accompanying compression and expansion of the main body of the seal which also separates the sets of shoulders and forces the seal side wall portions toward the cavity side wall portions, while the first and second members remain spaced from each other; and (3) when fluid pressure is applied to one side of the seal through the separated shoulders at that side during or subsequent to engagement of the sealing surface with the seat, the seal body is fluid compressed forcibly to abut along substantially the entire downstream side of the seal body against the opposite side wall portion of the cavity, the shoulders remain movably separated while the first and second members remain spaced from each other and the resulting compression additionally and variably forces the ring tongue seat against the sealing surface to obtain fluid pressure responsive and enhanced sealing.

11. A seal structure as claimed in claim 10 wherein the slot is defined by side walls and the sides of the tongue are spaced therefrom.

12. A seal structure as claimed in claim 10 wherein a side of the tongue is spaced from a side wall of the slot.

13. A seal structure for providing fluid sealing in the presence or absence of fluid pressure between juxtaposed first and second members when the members are moved from an open to, or are in, a closed position;

the first of said members having a sealing surface;

the second member having an opposed second surface slightly spaced from the sealing surface of the first member and defining an intersurface space in the closed position; said second member having structure defining an interior cavity with a slot narrower than the cavity and extending between the second surface and the cavity and with opposed spaced interior side wall portions continuing from the cavity shoulders away from second surface and terminating in closely spaced groove defining walls extending from the main body portion at the end opposite said slot;

a fluid seal mounted in said cavity having an enlarged main body portion intermediate said shoulders and groove and including opposed exterior side wall portions adjacent to the interior side wall portions of the cavity to define spaced apart regions at opposite sides of the seal and terminating in structure extending from the main body portion of the seal into and being sealed in said groove, thereby to seal the regions on opposite sides of the seal from each other, the seal also having a tongue projecting through said slot into and remaining in the intersurface space and having a seat defining end engageable with and remaining engaged in that space with the sealing surface of the first member in the closed position, and external shoulders extending from the sides of the tongue in juxtaposition to the cavity underside shoulders;

the dimensions of the cavity and seal structures being such that: (1) in the open position in which the seat is not engaged with the sealing surface, the two sets of shoulders abut with substantial force; (2) when the seat and sealing surface are engaged in closed position they effect an initial seal in the absence of fluid pressure by movement of the engaged seat and accompanying compression and expansion of the main body of the seal which also separates the sets of shoulders to provide access to said spaced apart regions and forces the seal side wall portions toward the cavity side wall portions; and (3) when fluid pressure is applied to the region at one side of the seal past the separated shoulders at that side during or subsequent to engagement of the sealing surface with the seat, the seal body is fluid compressed forcibly to abut along substantially the entire downstream side of the seal body against the opposite side wall portion of the cavity, the shoulders remain movably separated in the cavity and the aforesaid compression additionally and variably forces the ring tongue seat against the sealing surface to obtain fluid pressure responsive and enhanced sealing.

14. A seal structure as claimed in claim 13 wherein the opposed exterior side wall portions of the enlarged main body portion of the seal are spaced from the interior side wall portions of the cavity in said open position and abut the interior side wall portions in said closed position.

* * * * *

UNITED STATES PATENT AND TRADEMARK OFFICE
CERTIFICATE OF CORRECTION

PATENT NO. : 4,266,752

DATED : May 12, 1981

INVENTOR(S) : Stephen A. Johnson

It is certified that error appears in the above-identified patent and that said Letters Patent are hereby corrected as shown below:

Column 1, line 58, "of" should read --for--.

Column 4, line 51, "performed" should read --preformed--.

Signed and Sealed this

Third Day of November 1981

[SEAL]

Attest:

Attesting Officer

GERALD J. MOSSINGHOFF

Commissioner of Patents and Trademarks